United States Patent [19]

Prabhu et al.

[11] Patent Number: 5,231,195
[45] Date of Patent: Jul. 27, 1993

[54] ETHYLENICALLY UNSATURATED PHENOLPHTHALEINIC MONOMERS

[75] Inventors: Vaikunth S. Prabhu, Murrysville; Charles R. Coleman, Pittsburgh, both of Pa.

[73] Assignee: PPG Industries, Inc., Pittsburgh, Pa.

[21] Appl. No.: 977,960

[22] Filed: Nov. 18, 1992

Related U.S. Application Data

[62] Division of Ser. No. 705,212, May 24, 1991, abandoned.

[51] Int. Cl.$^5$ .................. C07D 307/00; C08F 124/00
[52] U.S. Cl. ..................................... 549/308; 526/268
[58] Field of Search ........................................ 549/308

[56] References Cited

U.S. PATENT DOCUMENTS

| | | | |
|---|---|---|---|
| 1,951,782 | 3/1934 | Bauer et al. | 260/106 |
| 2,370,567 | 2/1945 | Muskat et al. | 260/463 |
| 2,455,652 | 12/1948 | Bralley et al. | 260/77.5 |
| 2,455,653 | 12/1948 | Bralley et al. | 260/77.5 |
| 2,587,437 | 2/1952 | Bralley et al. | 260/77.5 |
| 4,725,631 | 2/1988 | Bastioli et al. | 523/115 |
| 4,742,133 | 5/1988 | Tang et al. | 526/235 |
| 4,746,716 | 5/1988 | Oates | 526/314 |
| 4,812,591 | 3/1989 | Buysch et al. | 560/140 |
| 4,829,136 | 5/1989 | Oates | 526/230.5 |
| 4,959,433 | 9/1990 | Oates et al. | 526/314 |
| 5,017,666 | 5/1991 | Crano et al. | 528/230.5 |

FOREIGN PATENT DOCUMENTS

| | | |
|---|---|---|
| 538729 | 3/1957 | Canada . |
| 0144782 | 6/1985 | European Pat. Off. . |
| 0304784 | 3/1989 | European Pat. Off. . |
| 615074 | 6/1978 | U.S.S.R. . |

OTHER PUBLICATIONS

M. Minoru Kawaguchi et al, "Synthesis and Physical Properties of Polyfunctional Methacrylates (Part 4). Synthesis and Physical Properties of Aromatic Dimethacrylate Copolymers", Dental Materials Journal 3(2): 272–279, 1984.

*Primary Examiner*—Joseph L. Schofer
*Assistant Examiner*—Wu C. Cheng
*Attorney, Agent, or Firm*—George D. Morris

[57] ABSTRACT

Phenolphthaleinic bis(acrylate), phenolphthaleinic bis(methacrylate), and phenolphthaleinic (acrylate) (methacrylate) may be polymerized to form polymerizates especially useful for lenses and lens blanks.

4 Claims, No Drawings

ETHYLENICALLY UNSATURATED PHENOLPHTHALEINIC MONOMERS

This is a division of application Ser. No. 07/705,212 filed May 24, 1991 now abandoned.

Aliphatic polyol poly(acrylic) monomers have been used or considered for use in producing ophthalmic lenses. Such lenses exhibit substantial hardnesses and refractive indices that are sufficient for many, if not most ophthalmic applications. There is a need, however, for polymeric lenses of higher refractive indices than those ordinarily provided by polymers of the above-described aliphatic monomers.

This need centers around the desire to reduce the volume of material required to produce a lens of given size, minimum thickness, and optical correction, which volumetric reduction can be achieved through use of polymeric materials having higher refractive indices. It is known that polymers formed from bisphenol bis(acrylic) monomers often have higher refractive indices than those formed from aliphatic polyol poly(acrylic) monomers. Some bisphenol bis(acrylic) monomers, however, are capable of producing polymers of higher refractive indices than others. High refractive index is not the only criterion, however. The polymer must also possess other physical properties which render it satisfactory for ophthalmic lenses. Among such physical properties are acceptable hardness and, for most ophthalmic applications, acceptably low yellowness. Some bisphenol bis(acrylic) monomers are capable of producing polymers of high refractive indices, but the polymers fail to exhibit one or more other satisfactory physical properties. The search for those bisphenol bis(acrylic) monomers capable of producing polymers exhibiting higher than usual refractive indices and other satisfactory physical properties therefore continues.

THE INVENTION

It has now been discovered that phenolphthaleinic bis(acrylic) compounds are capable of producing polymers of high refractive indices and other physical properties satisfactory for ophthalmic purposes.

Accordingly, one embodiment of the invention is an ethylenically unsaturated phenolphthaleinic compound represented by the formula

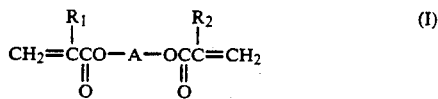

(I)

wherein $R_1$ and $R_2$ are each individually hydrogen or methyl, and A is represented by the formula

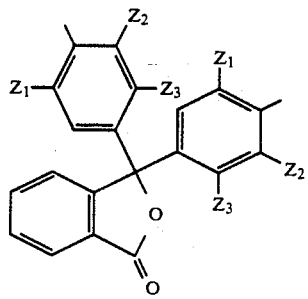

(II)

wherein $Z_1$ is hydrogen, methyl, isopropyl, or halo, $Z_2$ is hydrogen or halo, and $Z_3$ is hydrogen or methyl.

Although one of $R_1$ and $R_2$ may be hydrogen while the other is methyl, it is preferred either that $R_1$ and $R_2$ are both hydrogen or that $R_1$ and $R_2$ are both methyl.

Most commonly, but not necessarily, $Z_1$, $Z_2$, and $Z_3$ are each hydrogen; or $Z_1$ is methyl while $Z_2$ and $Z_3$ are both hydrogen; or $Z_1$ and $Z_3$ are both methyl while $Z_2$ is hydrogen; or $Z_1$ is isopropyl while $Z_2$ is hydrogen and $Z_3$ is methyl; or $Z_1$ and $Z_2$ are halo white $Z_3$ is hydrogen. It is preferred that $Z_1$, $Z_2$ and $Z_3$ are each hydrogen.

As indicated above, $Z_1$, $Z_2$, or both $Z_1$ and $Z_2$ may be halo. In most cases each halo is independently chloro, bromo, or iodo. When $Z_1$ and $Z_2$ are both halo, the halo groups may be the same or they may be different, but preferably they are the same.

Examples of ethylenically unsaturated phenolphthaleinic compounds of the invention include phenolphthalein bis(acrylate), phenolphthalein bis(methacrylate), phenolphthalein (acrylate) (methacrylate), o-cresolphthalein bis(acrylate), o-cresolphthalein bis(methacrylate), o-cresolphthalein (acrylate) (methacrylate), xylenolphthalein bis(allyl carbonate), xylenolphthalein bis(acrylate), xylenolphthalein bis(methacrylate), xylenolphthalein (acrylate) (methacrylate), thymolphthalein bis(acrylate), thymolphthalein bis(methacrylate), thymolphthalein (acrylate) (methacrylate), tetrachlorophenolphthalein bis(acrylate), tetrachlorophenolphthalein bis(methacrylate), tetrachlorophenolphthalein (acrylate) (methacrylate), tetrabromophenolphthalein bis(acrylate), tetrabromophenolphthalein bis(methacrylate), tetrabromophenolphthalein (acrylate) (methacrylate), tetraiodophenolphthalein bis(acrylate), tetraiodophenolphthalein bis(methacrylate), and tetraiodophenolphthalein (acrylate) (methacrylate).

Another embodiment of the invention is a mixture of polymerizable compounds, which mixture comprises at least one ethylenically unsaturated phenolphthaleinic compound described above.

The ethylenically unsaturated phenolphthaleinic compounds described above may be prepared by reacting phenolphthalein [CAS 77-09-8], o-cresolphthalein [CAS 596-27-0], xylenolphthalein [CAS 50984-88-8], thymophthalein [CAS 125-20-2], tetrachlorophenolphthalein [CAS 81-89-0], tetrabromophenolphthalein [CAS 76-62-0], or tetraiodophenolphthalein [CAS 386-17-4] with one or more halocarbonyl compounds represented by the formula

(III)

and amine in the liquid phase and under substantially anhydrous conditions wherein R is hydrogen or methyl, and X is chloro or bromo.

Examples of halocarbonyl compounds which can be used include acryloyl chloride, methacryloyl chloride, acryloyl bromide, and methacryloyl bromide. A single halocarbonyl compound or a mixture of halocarbonyl compounds may be used as desired.

The ultimate, that is the final, proportions of reactants are at least approximately stoichiometric. Preferably the substituted or unsubstituted phenolphthalein is not in excess.

In most cases the ultimate equivalent ratio of halocarbonyl compound to substituted or unsubstituted phenolphthalein is in the range of from about 1:1 to about 1.1:1.

Often the ultimate equivalent ratio of amine to halocarbonyl compound is in the range of from about 1:1 to about 1.1:1. From about 1.01:1 to about 1.05:1 is preferred.

The ester-forming reaction is generally conducted at temperatures in the range of from about 0° C. to about 50° C. From about 0° C. to about 15° C. is preferred.

The amine may be any tertiary amine which scavenges hydrogen chloride and/or hydrogen bromide as it is formed during the reaction. The amine may be aliphatic, cyclic or aromatic. A single amine or a mixture of amines may be used as desired.

In most cases the amine employed contains at least 3 carbon atoms. Usually the amine contains from 3 to about 18 carbon atoms. From about 5 to about 6 carbon atoms are preferred.

Examples of suitable aliphatic amines include trimethylamine, triethylamine, tripropylamine, diethylmethylamine, dimethylethylamine, tributylamine, tripentylamine, and trihexylamine, The cyclic amines usually contain at least about 5 carbon atoms. From about 5 to about 10 carbon atoms are preferred. Examples of cyclic amines that can be used include N-methylpyrrolidine, N-methylpiperidine, N-methylmorpholine, N-phenylmorpholine, 1,5-diazabicyclo[4.3.0]non-5-ene, 1,4-diazabicyclo[2.2.2]octane, and 1,8-diazabicyclo[5.4.0]undec-7-ene.

The aromatic amines frequently contain at least about 5 carbon atoms. From about 5 to about 15 carbon atoms are preferred. Examples of aromatic amines that can be used include N,N-dimethylaniline, the N,N-dimethyltoluidines, the N,N-dimethylxylidines, N,N-dimethylbenzylamine, pyridine, dimethylaminopyridine, and alkyl derivatives of pyridine.

Extrinsic solvent may be used when desirable or necessary to solubilize one or more of the reactants. Examples of suitable extrinsic solvents that may be used include benzene, toluene, xylene, chlorobenzene, o-dichlorobenzene, o-chlorotoluene, acetone, methylene chloride, chloroform, perchloroethylene, trichloroethylene, and carbon tetrachloride. The pressure at which the reactions are conducted may vary widely, but usually they are at about ambient pressure or a little higher depending upon the pressure drop through the equipment.

The monomer contains one or more compounds represented by Formula (I). Because of the process by which the monomer is made, the reaction product can and usually does contain one or more related compounds. Such related compounds usually include hydroxy-functional partially esterified compounds and/or oligomers. The product may be purified so as to contain essentially not related compounds, but this is rarely done. Although the product may contain only a single related compound, it usually contains a mixture of different related compounds. Ordinarily all of the related compounds taken together constitute from about 0.1 to about 5 weight percent of the product.

Once the reaction has been completed the extrinsic solvent present, if any, is removed. This is generally accomplished by stripping under vacuum, but any other well known technique for removing solvents from liquid organic compounds may be employed.

An improvement to the general process has been discovered which is especially useful for the preparation of bis[(meth)acrylate] monomers of substituted or unsubstituted phenolphthalein. In the preparation of (meth)acrylate monomers of phenolic compounds, it is customary to place the phenolic compound and the amine in a reaction vessel and then to slowly add acryloyl chloride and/or methacryloyl chloride. It has been found that this procedure often leads to an unacceptably high yellow color in the resulting monomer. It has now been discovered that by keeping the amine concentration in the reaction mixture low, the monomer produced often exhibits little or no yellowness. Therefore, in the process for producing (meth)acrylate monomer of phenolic compound wherein phenolic compound is reacted with halocarbonyl compound selected from the group consisting of acryloyl chloride, acryloyl bromide, methacryloyl chloride, methacryloyl bromide, and mixtures thereof, in a liquid reaction mixture under substantially anhydrous conditions and in the presence of tertiary amine, the improvement wherein the concentration of the amine in the liquid reaction mixture expressed in equivalents per liter is less than or equal to the concentration of the halocarbonyl compound in the liquid reaction mixture expressed in equivalents per liter until substantially all of the phenolic compound has been consumed.

Examples of suitable phenolic compounds include
3,3-bis(4-hydroxyphenyl)-1(3H)-isobenzofuranone [phenolphthalein; CAS 77-09-8],
3,3-bis(4-hydroxy-3-methylphenyl)-1(3H)-isobenzofuranone [o-cresolphthalein; CAS 596-27-0],
3,3-bis(4-hydroxy-2,5-dimethylphenyl)-1(3H)-isobenzofuranone [xylenolphthalein; CAS 50984-88-8],
3,3-bis(4-hydroxy-2-methyl-5-(1-methylethyl)phenyl)-1(3H)-isobenzofuranone [thymolphthalein; CAS 125-20-2],
3,3-bis(3,5-dichloro-4-hydroxyphenyl)-1(3H)-isobenzofuranone [tetrachlorophenolphthalein; CAS 81-89-0],
3,3-bis(3,5-dibromo-4-hydroxyphenyl)-1(3H)-isobenzofuranone [tetrabromophenolphthalein; CAS 76-62-0], and
3,3-bis(4-hydroxy-3,5-diiodophenyl)-1(3H)-isobenzofuranone [tetraiodophenolphthalein; CAS 386-17-4].

A single phenolic compound or a mixture of phenolic compounds may be used as desired.

In the improved process, as in the general process for preparing the phenolphthaleinic bis(acrylic) monomers of the invention described above, the ultimate proportions of reactants are at least approximately stoichiometric. Preferably the phenolic compound is not in excess.

In most cases the ultimate equivalent ratio of halocarbonyl compound to phenolic compound is in the range of from about 1:1 to about 1.1:1.

One or more antioxidants may optionally be included in the reaction mixture. The antioxidant may be a phenolic compound reactant, although this is not necessary. An example of a suitable antioxidant which is also a phenolic compound reactant, is 4-methoxyphenol, although other well known antioxidants may be used.

The amount of antioxidant present may vary widely. When the antioxidant is also a phenolic compound reactant, it may constitute all or any portion of the phenolic compound reactant used in the reaction. In those cases when the antioxidant which is also a phenolic compound reactant is included primarily for its antioxidation effect, it is usually present in a concentration of from about 1 to about 2000 parts per million of the reaction mixture. When the antioxidant is not a phenolic compound reactant, it similarly is usually present in a concentration of from about 1 to about 2000 parts per million of the reaction mixture.

Extrinsic solvent may be used when desirable or necessary to solubilize one or more of the reactants. Examples of suitable extrinsic solvents that may be used include benzene, toluene, xylene, chlorobenzene, o-dichlorobenzene, o-chlorotoluene, acetone, methylene chloride, chloroform, perchloroethylene, trichloroethylene, and carbon tetrachloride. The pressure at which the reactions are conducted may vary widely, but usually they are at about ambient pressure or a little higher depending upon the pressure drop through the equipment.

The identities and proportions of the other reactants and materials, and the reaction conditions are as described above for the general process for preparing the phenolphthaleinic bis(acrylic) monomers of the invention.

When desired, polymerizable liquid prepolymers may be formed from the polymerizable ethylenically unsaturated phenolphthaleinic compounds of the present invention by partially polymerizing the compounds to utilize a fraction of the allylic or acrylic groups without incurring significant gellation. The preferred prepolymers are those prepared in accordance with the general procedures described in detail in European Patent Publication No. 0 144 782 A2 and in U.S. patent application Ser. No. 24,878, filed Mar. 12, 1987, the entire disclosures of which are incorporated herein by reference.

The amount of ethylenically unsaturated phenolphthaleinic monomer present in the polymerizable composition is susceptible to wide variation. Ordinarily, the ethylenically unsaturated phenolphthaleinic monomer is present in the polymerizable composition in an amount in the range of from about 10 to 100 percent by weight. Often the ethylenically unsaturated phenolphthaleinic monomer is present in an amount in the range of from about 30 to about 99.5 percent by weight. In many cases the ethylenically unsaturated phenolphthaleinic monomer is present in an amount in the range of from about 50 to about 99.5 percent by weight.

There are many materials which may optionally be present in the polymerizable composition of the present invention.

When, as is preferred, polymerization of the polymerizable composition is initiated by thermally generated free radicals, the polymerizable composition contains initiator. The initiators which may be used in the present invention may be widely varied, but in general they are thermally decomposable to produce radical pairs. One or both members of the radical pair are available to initiate addition polymerisation of ethylenically unsaturated groups in the well-known manner.

The preferred initiators are peroxy initiators. Examples if suitable peroxy initiators include those represented by any of the following formulae:

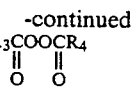

wherein $R_3$ and $R_4$ are each individually phenyl, phenylalkyl in which the alkyl portion is straight or branched and contains from 1 to about 10 carbon atoms, straight alkyl containing from 1 to about 20 carbon atoms, branched alkyl containing from 3 to about 20 carbon atoms, cycloalkyl containing from about 5 to about 12 carbon atoms, or polycycloalkyl containing from about 7 to about 12 carbon atoms. The specific groups used for $R_3$ and $R_4$ may be the same or they may be different.

It is be understood that unless otherwise qualified, either expressly or contextually, any of the above groups may be substituted with one or more minor substituents so long as their numbers and identities do not render the initiator unsuitable for its intended purpose. Halo groups, alkoxy groups containing from 1 to about 4 carbon atoms, and polyhaloalkyl groups containing fron 1 to about 4 carbon atoms, are examples of substituents which may be used. Alkyl groups containing from 1 to about 4 carbon atoms may be used as substituents on non-aliphatic groups or on non-aliphatic portions of complex groups.

The phenylalkyl groups used for $R_3$, $R_4$, or both $R_3$ and $R_4$ often contain from 1 to about 4 carbon atoms in the alkyl portion. Benzyl and phenylethyl are preferred.

The branched alkyl groups often have at least one branch in the 1-position or the 2-position. In many cases each branched alkyl group contains from 3 to about 8 carbon atoms. Preferably, each branched alkyl group contains 3 or 5 carbon atoms.

Examples of branched alkyl groups that may be used include isopropyl, secondary butyl, isobutyl, tertiary butyl, 1-methylbutyl, 2-methylbutyl, tertiary pentyl, 1,2-dimethylpropyl, neopentyl, 1-methylpentyl, 2-methylpentyl, 1,1-dimethylbutyl, 1,2-dimethylbutyl, 1,3-dimethylbutyl, 2,2-dimethylbutyl, 1-ethylbutyl, 2-ethylbutyl, 2-ethylhexyl, 2,4,4-trimethylpentyl, and 1-ethyldecyl. Preferred are secondary butyl, tertiary butyl, and neopentyl.

The cycloalkyl often contains from about 5 to about 8 carbon atoms.

Examples of cycloalkyl groups include cyclopentyl, cyclohexyl, cycloheptyl, cyclooctyl, cyclodecyl, and cyclododecyl. Cyclohexyl is preferred.

The polycycloalkyl generally contains from about 7 to about 10 carbon atoms.

Examples of polycycloalkyl groups that may be used include 1-norbornyl, 2-bornyl, and 1-adamantyl.

Exemplary peroxy initiators include peroxydicarbonate esters such as di-n-propyl peroxydicarbonate, diisopropyl peroxydicarbonate, di-n-butyl peroxydicarbonate, di-sec-butyl peroxydicarbonate, diisobutyl peroxydicarbonate, di(2-ethylhexyl) peroxydicarbonate, diacetyl peroxy dicarbonate, dicyclohexyl peroxydicarbonate, di(4-tert-butylcyclohexyl) peroxy dicarbonate, and isopropyl sec-butyl peroxydicarbonate; diacetyl peroxides such as diacetyl peroxide, dibenzoyl peroxide, dilauroyl peroxide, and diisobutyryl peroxide; and peroxy esters such as tertiary-butyl perpivalate, tertiary-butyl peroctoate, and tertiary-butyl perneodecanoate. Diisopropyl peroxydicarbonate and benzoyl peroxide are the preferred initiators.

Other examples of suitable peroxy initiators include monoperoxycarbonates represented by the following formula:

wherein $R_5$ is tertiary-butyl or tertiary-amyl and $R_6$ is an alkyl group containing from about 3 to about 7 carbon atoms. Examples of alkyl groups representative of $R_6$ include n-propyl, isopropyl, n-butyl, isobutyl, secondary-butyl n-amyl, isoamyl, secondary-amyl, n-hexyl, isohexyl, secondary-hexyl, n-heptyl, and 2,4-dimethyl-3-pentyl. Particularly preferred monoperoxycarbonates are tertiary-butylperoxy isopropyl carbonate and tertiary-amyl peroxyisopropyl carbonate.

Only one initiator or a plurality of initiators may be used as desired.

When used, the amount of initiator present in the polymerizable composition may be widely varied. Ordinarily the weight ratio of the initiator to all ethylenically unsaturated material present in the composition is in the range of from about 0.5:100 to about 7:100. In many cases the weight ratio is in the range of from about 1:100 to about 5:100. A weight ratio in the range of from about 2:100 to about 4:100 is preferred.

It is to be recognized by those skilled in the art that the most preferred weight ratios of initiator will depend upon the nature of the initiator used (its active oxygen content) as well as the nature and ratios of the various ethylenically unsaturated materials present in the composition.

Non-aromatic bis(allylic carbonate) monomer is a material which can optionally be present in the polymerizable compositions of the invention. Such monomer comprises one or more non-aromatic bis(allylic carbonate)-functional monomeric compounds which are bis(allylic carbonates) of linear or branched aliphatic diols, cycloaliphatic diols, or diols containing at least one divalent aliphatic portion and at least one divalent cycloaliphatic portion. These monomers can be prepared by procedures well known in the art, for example, those described in U.S. Pat. Nos. 2,370,567 and 2,403,113, the entire disclosures of which are incorporated herein by reference. In the latter patent, the monomers are prepared by treating the non-aromatic diol with phosgene at temperatures between 0° C. and 20° C. to form corresponding bischloroformate The bischloroformate is then reacted with an unsaturated alcohol in the presence of a suitable acid acceptor, as for example, pyridine, a tertiary amine, or an alkali or alkaline earth metal hydroxide. Alternatively, the unsaturated alcohol can be reacted with phosgene and the resulting chloroformate reacted with the non-aromatic diol in the presence of an alkaline reagent, as described in U.S. Pat. No. 2,370,567.

The non-aromatic bis(allylic carbonate) monomeric compounds can each be represented by the formula

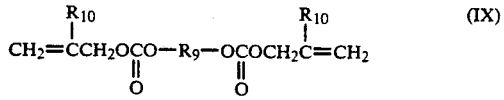

in which $R_9$ is the divalent radical derived from the non-aromatic diol and each $R_{10}$ is independently hydrogen, halo, or an alkyl group containing from 1 to about 4 carbon atoms. The alkyl group is usually methyl or ethyl. Most commonly both groups represented by $R_{10}$ are either hydrogen or methyl; hydrogen is preferred.

The aliphatic diol from which the non-aromatic bis-(allylic carbonate)-functional monomeric compounds may be derived can be linear or branched and can contain from 2 to about 10 carbon atoms. Commonly, the aliphatic diol is an alkylene glycol having from 2 to 4 carbon atoms or a poly($C_2$-$C_4$) alkylene glycol. Examples of such compounds include ethylene glycol, propylene glycol, 1,3-propanediol, 1,4-butanediol, 1,3-butanediol, 1,5-pentanediol, 1,6-hexanediol, 1,8-octanediol, 2-ethyl-1,6-hexanediol, 1,10-decanediol, diethylene glycol, triethylene glycol, tetraethylene glycol, $HOCH_2CH_2CH_2OCH_2CH_2OCH_2CH_2C$-$H_2OH$, dipropylene glycol, tripropylene glycol, and tetrapropylene glycol. Other examples include alkylene carbonate and alkylene ether carbonate diols such as $HOCH_2CH_2OC(O)OCH_2CH_2OH$ and $HOCH_2C$-$H_2OCH_2CH_2OC(O)OCH_2CH_2CH_2CH_2OH$.

The cycloaliphatic diols from which the non-aromatic bis(allylic carbonate)-functional monomeric compounds may be derived usually contain from about 5 to about 8 carbon atoms. Ordinarily, the cycloaliphatic diol contains from about 6 to about 8 carbon atoms. Examples include 1,3-cyclohexanediol, 1,4-cyclohexanediol, and 1,5-cyclooctanediol.

Examples of diols containing at least one divalent aliphatic portion and at least one cycloaliphatic portion which may be used include 4,4'-methylenebis[cyclohexanol], 4,4'-(methylethylidene)bis[cyclohexanol], 2,2'-(1,4-cyclohexanediyl)bis[ethanol], and 1,4-cyclohexanediylbis[methanol].

The non-aromatic diols from which non-aromatic bis(allylic carbonate) monomeric compounds may be derived may also be aliphatic diol-functional chain extended compounds. Examples of such compounds based on alkylene oxide extension include ethylene oxide extended 1,6-hexanediol and polypropylene oxide extended 1,6-hexanediol.

The preferred non-aromatic bis(allylic carbonate) monomeric compounds are aliphatic bis(allylic carbonate) monomeric compounds. Most commonly $R_9$ is $—CH_2CH_2—$, $—CH_2CH_2OCH_2CH_2—$, or $—CH_2C$-$H_2OCH_2CH_2OCH_2CH_2—$.

Specific examples of aliphatic bis(allylic carbonate) monomeric compounds useful in the practice of the invention include ethylene glycol bis(2-chloroallyl carbonate), ethylene glycol bis(allyl carbonate), 1,4-butanediol bis(allyl carbonate), 1,5-pentanediol bis(allyl carbonate), 1,6-hexanediol bis(allyl carbonate), diethylene glycol bis(allyl carbonate), triethylene glycol bis(aayl carbonate), propylene glycol bis(allyl carbonate), 1,3-propanediol bis(allyl carbonate), 1,3-butanediol bis-(allyl carbonate), 1,4-butanediol bis(methallyl carbonate), and dipropylene glycol bis(allyl carbonate). The preferred aliphatic bis(allyl carbonate) monomeric compounds are ethylene glycol bis(allyl carbonate), diethylene glycol bis (allyl carbonate), and triethylene glycol bis(allyl carbonate). Diethylene glycol bis(allyl carbonate) [CAS 142-22-3] is especially preferred.

The amount of non-aromatic bis(allylic carbonate) monomer present in the polymerizable composition may be widely varied. When it is used, the weight ratio of the non-aromatic bis(allylic carbonate) monomer to all ethylenically unsaturated material present in the composition is ordinarily in the range of from about 0.1:100 to about 20:100. Often the weight ratio is in the range of from about 1:100 to about 15:100. A weight ratio in the range of from about 2:100 to about 10:100 is preferred.

Another material which may optionally be present is non-aromatic poly(allylic carbonate) prepolymer. This material is prepared by partially polymerizing non-aromatic poly(allylic carbonate)-functional monomer to utilize a fraction of the allylic groups without incurring significant gellation. The preferred non-aromatic poly-(allylic carbonate) prepolymers are those prepared in accordance with the procedures described in detail in European Patent Publication No. 0 144 782 A2. The preparation is analogous to the preparation of the bisphenol poly(allylic carbonate) prepolymer, except that non-aromatic poly(allylic carbonate) monomer is used rather than bisphenol bis(allylic carbonate) monomer. Following partial polymerization, the solvent in the composition can be removed by known techniques, e.g., by evaporation or distillation, leaving a viscous polymerizable liquid.

The amount of non-aromatic bis(allylic carbonate) prepolymer present in the polymerizable composition may be widely varied. When it is used, the weight ratio of the non-aromatic bis(allylic carbonate) prepolymer to all ethylenically unsaturated material present in the composition is ordinarily in the range of from about 0.1:100 to about 20:100. Often the weight ratio is in the range of from about 1:100 to about 15:100. A weight ratio in the range of from about 2:100 to about 10:100 is preferred.

In addition to the phenolphthaleinic bis(allylic carbonate) material and/or phenolphthaleinic bis(acrylic) material described above, other bisphenol bis(allylic carbonate) materials (i.e., monomer, prepolymer, or mixtures thereof) may optionally be present in the polymerizable compositions of the invention. There are many other such bisphenol bis(allylic carbonate) materials which are known. Examples of the materials include monomers such as 4,4'-(1-methylethylidene)bis[phenol] bis(allyl carbonate) [CAS 84000-75-9], 4,4'-(1-methylethylidene)bis[2,6-dibromophenol] bis(allyl carbonate) [CAS 27961-25-7], and 4,4'-(1-methylethylidene)bis[2,6-dibromophenol] bis(allyl carbonate) [CAS 98572-84-0]. Prepolymers of the bisphenol bis(allylic carbonate) monomers may be prepared in accordance with European Patent Publication No. 0 144 782 A2 or U.S. patent application Ser. No. 24,878, filed Mar. 12, 1987 and used in the polymerizable compositions of the present invention.

The amount of other bisphenol bis(allylic carbonate) material present in the polymerizable composition of the present invention may vary widely. When it is used, the weight ratio of the other bisphenol bis(allylic carbonate) material to all ethylenically unsaturated material present in the composition is usually in the range of from about 5:100 to about 50:100. Often the weight ratio is in the range of from about 10:100 to about 35:100. A weight ratio in the range of from about 10:100 to about 20:100 is preferred.

Another material that may optionally be present is diester represented by the formula

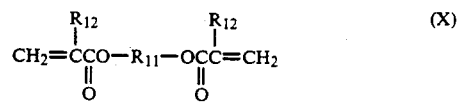

where $R_{11}$ is a divalent organo group other than that of Formula (II) which may be aromatic, non-aromatic, or partially aromatic and partially non-aromatic, and where each $R_{12}$ is independently hydrogen, halo, or an alkyl group containing from 1 to about 4 carbon atoms. Usually both groups represented by $R_{12}$ are either hydrogen or both are methyl. These diesters are esterification products of dihydroxy-functional materials with one or more acrylic acids. They are well known compounds and may be prepared by well known procedures.

The amount of the diester present in the polymerizable composition may also be widely varied. When it is used, the weight ratio of the diester to all ethylenically unsaturated material present in the composition is generally in the range of from about 0.1:100 to about 20:100. Frequently the weight ratio is in the range of from about 1:100 to about 15:100. A weight ratio in the range of from about 2:100 to about 10:100 is preferred.

Yet another optional material which may be present is monofunctional acrylate represented by the formula

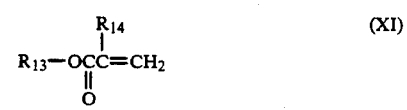

where $R_{13}$ is a monovalent organo group and $R_{14}$ is hydrogen, halo, or an alkyl group containing from 1 to about 4 carbon atoms.

The monofunctional acrylates represented by Formula (XI) are themselves well known compounds. The monovalent organo group, $R_{13}$, may be aliphatic, cycloaliphatic, aromatic, or a combination of two or more of these properties. Most often $R_{13}$ is is alkyl containg from 1 to about 4 carbon atoms, cycloalkyl containing from about 5 to about 8 carbon atoms, phenyl, or benzyl. It is preferred that $R_{13}$ be methyl, ethyl, butyl, isobutyl, cyclohexyl, phenyl, or benzyl. $R_{14}$ is usually hydrogen or methyl. Examples of monofunctional acrylates include methyl acrylate, methyl methacrylate, ethyl acrylate, ethyl methacrylate, butyl acrylate, butyl methacrylate, isobutyl methacrylate, cyclohexyl methacrylate, phenyl methacrylate, and benzyl methacrylate. The methacrylic acid esters, as for example, isobutyl methacrylate, are preferred.

The amount of monofunctional acrylate present in the polymerizable composition may be varied considerably. When the monofunctional acrylate is used, the weight ratio of the monofunctional acrylate to all ethylenically unsaturated material present in the composition is ordinarily in the range of from about 0.1:100 to about 25:100. Often the weight ratio is in the range of from about 1:100 to about 15:100. A weight ratio in the range of from about 2:100 to about 10:100 is preferred.

One or more ethylenically unsaturated monomers not heretofore discussed may optionally be present in the polymerizable composition of the invention. Illustrative of such monomers are alkyl esters of ethylenically unsaturated dicarboxylic acids, cycloalkyl esters of ethylenically unsaturated dicarboxylic acids, allyl esters of saturated or ethylenically unsaturated dicarboxylic acids, vinyl esters of saturated monocarboxylic acids, vinyl benzoate, styrene, substituted styrene, divinyl benzene, diallylic esters of any of the phthalic acids, tris and higher functional allylic compounds which include tris and higher functional allylic carbonate compounds. It is preferred that the vinyl esters of saturated monocarboxylic acids contain from 4 to about 6 carbon atoms. Vinyl acetate is especially preferred. When used, the weight ratio of these materials to all ethylenically unsaturated material present in the composition is usually in the range of from about 0.1:100 to about 15:100. A weight ratio in the range of from about 0.1:100 to about 10:100 is preferred. When used, the weight ratio of vinyl ester of saturated monocarboxylic acid to all ethylenically unsaturated material present in the composition is usually in the range of from about 0.1:100 to about 15:100; a weight ratio in the range of from about 0.1:100 to about 10:100 is preferred.

Another material which may optionally be present in the polymerizable composition is mold release agent. When used, the mold release agent is employed in the polymerizable composition in amounts sufficient to ensure an intact, that is, umbroken and uncracked, casting which releases easily from the mold. The mold release agent should be compatible with the polymerizable composition and not adversely affect the physical properties of the casting. More particularly, the mold release agent should not adversely affect the physical properties most characteristic of the polymerizate such as its rigidity, hardness, index of optical refraction, transmission of visible light and absence of coloring which affects optical clartity. The mold release agent should, therefore, be a liquid, or, if a solid, be soluble in the polymerizable composition.

Mold release agents that may be used include alkyl phosphates and stearates. Among the alkyl phosphates that may be used as mold release agents are the mono and dialkyl phosphates and mixtures of mono and dialkyl phosphates which are commercially available from E. I. du Pont de Nemours & Co. under the trademarks Ortholeum ® and Zelex ® UN. These alkyl phosphates are reported to have straight chain alkyl groups of from 16 to 18 carbon atoms.

Other mold release agents that may be used include stearic acid and the metal salts of stearic acid, e.g., stearic acid salts of the metals zinc, calcium, lead, magnesium, barium, cadmium, aluminum, and lithium. Other fatty acids and fatty acid salts may be used provided they do not adversely affect the physical properties of the casting. Other mold release agents known to the art may be used.

When used, the mold release agent is ordinarily present in the polymerizable composition in an amount in the range of from about 1 to about 2000 parts by weight of mold release agent per million parts by weight of all ethylenically unsaturated material present (ppm). In many cases, an amount in the range of from about 20 to about 200 ppm is used. An amount in the range of from about 25 to about 100 ppm is preferred.

Dyes are optional materials that may be present when high transmission of light is not necessary.

Further examples of optional materials that may be present include small amounts of polymerization inhibitors to promote stability during storage and ultraviolet light adsorbers.

The listing of optional ingredients discussed above is by no means exhaustive. These and other ingredients may be employed in their customary amounts for their customary purposes so long as they do not seriously interfere with good polymer formulating practice.

In the polymerizable composition, the ethylenically unsaturated materials should be in the form of a solution in the proportions used. Insoluble optional materials, such as for example pigments, while not preferred, may also be present. It is particularly preferred that the polymerizable composition be homogeneous.

The polymerizable composition is usually pourable at ambient or slightly elevated temperatures. It is preferably a homogeneous liquid at such temperatures.

The polymerizable compositions of the invention are usually prepared by admixing the various ingredients. Mixing may be accompanied with heating when it is desirable to hasten dissolution of any of the ingredients. However, if initiator is present during heating, the temperature should ordinarily be maintained below that at which polymerization is initiated. It is preferred to employ heating in the absence of initiator, to cool the resulting solution, and then to introduce the initiator and other ingredients which enter the solution without undue difficulty.

The compounds of the invention can be free-radically polymerized by known conventional techniques for polymerizing acrylic-containing compositions to form solid, crosslinked polymer, or to form liquid pourable prepolymer which may subsequently be polymerized to form solid, thermoset polymer. A single compound of the invention may be polymerized or a mixture of polymerizable compounds, which mixture comprises at least one of the compounds of the invention, may be polymerized.

The preferred polymer of the invention (whether prepolymer or solid, thermoset polymer) comprises units represented by the formula

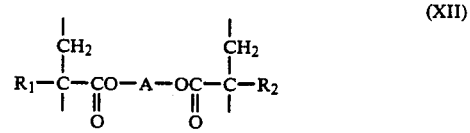

(XII)

where A, $R_1$, and $R_2$, are as described above in respect of Formula (I).

Preferably, polymerization is accomplished by heating the polymerisable composition to elevated temperatures in the presence of free-radical initiator. Usually the polymerizaation is conducted at temperatures in the range of from about 28° C. to about 100° C. In many cases post curing, that is, heating beyond the time thought necessary to substantially fully polymerize the composition is employed. The post cure is often carried out above about 100° C. but below the temperatures at which thermal degredation provides undesirable yellowness, e.g., about 125° C., and preferably for a time sufficient to attain either substantially constant or maximum Barcol hardness. For example, when the cure cycle shown in Table 2 below is followed, the polymerizate may be maintained at 100° C. for an additional 1 to 4 hours or more. Although not wishing to be bound by any theory, the additional 1 to 4 hours of post cure is believed to decompose, primarily by initiation and chain termination, from about 83 to about 99.9 percent of the peroxide initiator remaining unreacted at the end of the normal 18 hour cure cycle. Moreover, the additional 1 to 4 hours of cure often increases the Barcol hardness by about 5 to 8 units.

In most cases the polymerizable composition is conformed to the shape of the final solid polymeriazed article before polymerization. For example, the composition can be poured onto a flat surface and heated, whereby to effect polymerization and form a flat sheet. According to a still further exemplification, the polymerizable composition is placed in mold, as for instance glass molds, and the molds heated to effect polymerization, thereby forming shaped articles such as lens blanks or ophthalmic lenses. In one particularly preferred embodiment, the composition is poured into a lens mold and polymerized therein to produce an ophthalmic lens. In another particularly preferred embodiment, the composition is poured into a lens blank mold and polymerized therein to produce a lens blank.

A wide variety of cure cycles, that is, time-temperature sequences, may be used during polymerization. Ordinarily the cure cycle employed is based upon a consideration of several factors including the size of the casting, the identity of the initiator, and the reactivity of the ethylenically unsaturated material. For casting ophthalmic lenses or lens blanks, several exemplary cure cycles have been developed and these are shown in Tables 1–4. These exemplary cure cycles are useful in forming polymeriazates according to the present invention, but others may be used.

TABLE 1

Exemplary Cure Cycle for Diisopropyl Peroxydicarbonate

| Cumulative Hours | Oven Temperature, °C. |
|---|---|
| 0 | 44 |
| 2 | 46 |
| 4 | 48 |
| 6 | 50 |
| 8 | 54 |
| 10 | 58 |
| 12 | 64 |
| 14 | 69 |
| 16 | 85 |
| 17 | 105 |
| | (End of Cycle.) |

TABLE 2

Exemplary Eighteen Hour Cure Cycle for Benzoyl Peroxide

| Cumulative Hours | Oven Temperature, °C. |
|---|---|
| 0 | 63 |
| 2 | 63 |
| 4 | 65 |
| 6 | 67 |
| 8 | 77 |
| 10 | 80 |
| 12 | 85 |
| 14 | 88 |
| 16 | 92 |
| 18 | 100 |
| | (End of Cycle.) |

TABLE 3

Exemplary Five Hour Cure Cycle for Benzoyl Peroxide

| Cumulative Hours | Oven Temperature, °C. |
|---|---|
| 0 | 90 |
| 1 | 90 |
| 2 | 90 |
| 3 | 90 |
| 3.5 | 96 |
| 4 | 103 |
| 4.5 | 109 |
| 5 | 115 |

TABLE 3-continued

Exemplary Five Hour Cure Cycle for Benzoyl Peroxide

| Cumulative Hours | Oven Temperature, °C. |
|---|---|
| | (End of Cycle.) |

TABLE 4

Exemplary Cure Cycle for Tertiary-Butylperoxy Isopropyl Carbonate

| Cumulative Hours | Oven Temperature, °C. |
|---|---|
| 0 | 90 |
| 2 | 91 |
| 4 | 92 |
| 6 | 93 |
| 8 | 95 |
| 10 | 97 |
| 12 | 100 |
| 14 | 103 |
| 16 | 110 |
| 17 | 120 |
| | (End of Cycle.) |

The present solid, thermoset polymers of the invention usually have 15-second Barcol hardnesses of at least zero. In many cases the 15-second Barcol hardness is at least about 15, and preferably it is at least about 25. As used herein, 15-second Barcol hardness is determined in accordance with ASTM Test Method D 2583-81 using a Barcol Impressor and taking scale readings 15 seconds after the impressor point has penetrated the specimen. ASTM D 2583-81 is, in its entirety, incorporated herein by reference.

The present solid thermoset polymers usually also have refractive indices at 20° C. and a wavelength of 589.3 nanometers of at least about 1.52. Often the refractive index under the same conditions is at least about 1.53. Preferably it is at least about 1.55.

The present solid thermoset polymers usually also have Abbe numbers of at least about 20. Often the Abbe number is at least about 25. Preferably it is at least about 30. The Abbe number is calculated from the refractive index and dispersion which are determined in accordance with ASTM Test Method D 542-50. ASTM Test Method D 542-50 is, in its entirety, incorporated herein by reference.

the present solid thermoset polymers usually also have a heat distortion temperature of at least about 40° C. Often the heat distortion temperature is at least about 50° C. Preferably it is at least about 60° C. As used herein, the heat distortion temperature is determined in accordance with ASTM Test Method D 648-72. ASTM Test Method D 648-72 is, in its entirety, incorporated herein by reference.

The invention is further described in conjunction with the following examples which are to be considered illustrative rather than limiting, and in which all parts are parts by weight and all percentages are percentages by weight unless otherwise specified.

EXAMPLE 1

Preparation of Phenolphthalein Bis(methacrylate)

A 500-milliliter round bottom flask was charged with 42.49 grams of triethylamine and 200 milliliters of methylene chloride. The charged materials were cooled with stirring to 0° C. to 5° C. Over a 15 minute interval and under a nitrogen atmosphere, 63.66 grams of phenolphthalein was added portionwise to the flask with stirring.

The resulting mixture was then warmed to ambient temperature over a 30 minute interval.

A 1-liter, 4 necked, round bottom flask equipped with a stirrer, addition flask, nitrogen purge tube and thermometer was purged with nitrogen and charged with 42.86 grams of methacryloyl chloride, 0.1 gram of 4-methoxyphenol and 100 milliliters of methylene chloride. The charged materials were stirred and cooled to 0°-5° C. by placing the flask in a salt-ice bath.

The mixture of phenolphthalein and triethylamine in methylene chloride contained by the 500-milliliter flask was added to the contents of the one-liter flask, dropwise, through the addition flask over a period of 3 hours while maintaining the temperature of the reaction mixture between 0° C. and 5° C. The reaction mixture was then allowed to warm to room temperature (27° C.) over a period of 16 hours. The flow of nitrogen was discontinued and 200 milliliters of water was added. The reaction mixture was stirred for 20 minutes and then allowed to settle into two liquid layers. The organic phase was separated and sequentially washed once with 200 milliliters of water while stirring for 20 minutes, washed twice with 200 milliliters of cold 5% hydrochloric acid while stirring 20 minutes, and washed once with 200 milliliters of water while stirring 20 minutes. After the final phase separation, the pH of the wash water was 6-7.

The organic phase was transferred to an Erlenmayer flask. Ten grams of anhydrous magnesium sulfate and 0.2 gram of animal charcoal were added and the contents of the flask were stirred for 30 minutes. This mixture was then filtered through a cone of magnesium sulfate placed over a Waterman #41 filter paper. The filtered organic phase was transferred to a round bottom flask and methylene chloride was removed under aspirator vacuum (absolute pressure of about 2.7 to about 3.3 kilopascals). The resulting thick, colorless liquid product weighed 90.69 grams indicating a yield of 99.86 percent.

Infrared spectroscopy and nuclear magnetic resonance spectrascopy confirmed that the product was phenolphthalein bis(methacrylate). Thin layer chromatography, using methylene chloride as the eluent, $R_f=0.1$, yielded a single spot.

EXAMPLE 2

Polymerization of Phenolphthalein Bis(methacrylate)

A polymerizable, homogeneous composition was prepared by admixing 40.0 grams of phenolphthalein bis(methacrylate) and 0.4 gram of tertiary-butylperoxy isopropyl carbonate at temperatures in the range of from 40° C. to 90° C. to facilitate mixing and pouring into molds.

A glass mold was prepared by placing a pliable gasket between two glass sheets and applying large binder clips to hold the assembly together. The glass surfaces were treated with Rain-X® silicone release agent (Unelko Corp.). The polymerizable, homogeneous composition was poured into surface-treated molds and the filled molds were placed in a hot air oven and exposed to the Exemplary Cure Cycle for Tertiary-Butylperoxy Isopropyl Carbonate of Table 4. When the cure cycle was completed, the mold was removed from the oven and allowed to cool. The resulting polymerizate was then removed from the mold and tested for various physical properties. The following properties were observed:

Refractive Index: 1.5919
Abbe Number: 29.7.

Although the present invention has been described with reference to specific details of certain embodiments thereof, it is not intended that such details should be regarded as limitations upon the scope of the invention except insofar as they are included in the accompanying claims.

We claim:

1. An ethylenically unsaturated phenolphthaleinic compound represented by the formula

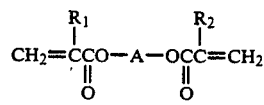

wherein $R_1$ and $R_2$ are each individually hydrogen or methyl, and A is represented by the formula

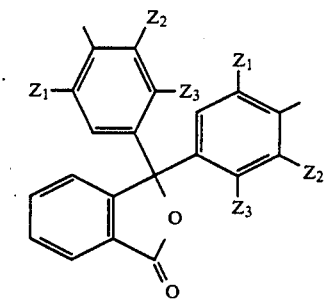

wherein $Z_1$ is hydrogen, methyl, isopropyl, or halo, $Z_2$ is hydrogen or halo, and $Z_3$ is hydrogen or methyl.

2. The compound of claim 1 which is phenolphthalein bis(acrylate).

3. The compound of claim 1 which is phenolphthalein bis(methacrylate).

4. A mixture of polymerizable compounds, said mixture comprising at least one ethylenically unsaturated phenolphthaleinic compound of claim 1.

* * * * *